(12) United States Patent
Guerreiro et al.

(10) Patent No.: US 10,719,955 B2
(45) Date of Patent: Jul. 21, 2020

(54) CAMERA EXTRINSIC PARAMETERS ESTIMATION FROM IMAGE LINES

(71) Applicant: Applications Solutions (Electronic and Vision) Ltd, Lewes (GB)

(72) Inventors: Rui Guerreiro, Hove (GB); Andreas Panakos, Neu-Ulm (DE); Carlos Silva, Eastbourne (GB); Dev Yadav, Abingdon (DE)

(73) Assignee: Application Solutions (Electronics and Vision) Ltd., West Sussex, Burgess Hill (GB)

( * ) Notice: Subject to any disclaimer, the term of this patent is extended or adjusted under 35 U.S.C. 154(b) by 0 days.

(21) Appl. No.: 15/783,185

(22) Filed: Oct. 13, 2017

(65) Prior Publication Data
US 2018/0040141 A1  Feb. 8, 2018

Related U.S. Application Data

(63) Continuation of application No. PCT/EP2016/057746, filed on Apr. 8, 2016.

(30) Foreign Application Priority Data

Apr. 23, 2015  (EP) ................. 15164760

(51) Int. Cl.
*G06T 7/80* (2017.01)
*G06K 9/00* (2006.01)

(52) U.S. Cl.
CPC ............ *G06T 7/80* (2017.01); *G06K 9/00791* (2013.01); *G06T 2207/30252* (2013.01)

(58) Field of Classification Search
CPC ...... G06K 9/00791; G06T 2207/30252; G06T 7/80
USPC .......................................................... 348/148
See application file for complete search history.

(56) References Cited

U.S. PATENT DOCUMENTS

| 10,008,000 | B2* | 6/2018 | Wu ............... G06T 7/80 |
| 2009/0290032 | A1* | 11/2009 | Zhang ............ B60R 1/00 348/211.9 |
| 2013/0085637 | A1* | 4/2013 | Grimm ............ B60W 30/06 701/25 |

(Continued)

FOREIGN PATENT DOCUMENTS

| EP | 2523163 A1 | 11/2012 |
| EP | 2597614 A1 | 5/2013 |
| JP | 2011215063 A | 10/2011 |

OTHER PUBLICATIONS

Li et al. "Easy Calibration of a Blind-Spot-Free Fisheye Camera System Using a Scene of a Parking Space" IEEE, vol. 12, No. 1, Mar. 2011 (Year: 2011).*

(Continued)

*Primary Examiner* — James T Boylan

(57) ABSTRACT

The application provides a method of calibrating a camera of a vehicle. The vehicle has a reference frame. The method comprises taking an image of a scene by the camera. The ground plane of the vehicle is then determined according to features of the image. An origin point of the vehicle reference frame is later defined as being located on the determined ground plane. A translation of a reference frame of the camera is afterward determined for aligning the camera reference frame with the vehicle reference frame.

10 Claims, 7 Drawing Sheets

(56) References Cited

U.S. PATENT DOCUMENTS

| | | | |
|---|---|---|---|
| 2016/0350921 A1* | 12/2016 | Bataller | G06K 9/00771 |
| 2017/0347030 A1* | 11/2017 | Guerreiro | G06T 5/006 |
| 2018/0101732 A1* | 4/2018 | Uchiyama | G06K 9/00771 |

OTHER PUBLICATIONS

Bazin et al. "3-line RANSAC for Orthogonal Vanishing Point Detection" IEEE 2012 (Year: 2012).*

Rother "A new approach to Vanishing Point Detection in Architectural Environments" Jan. 14, 2002 (Year: 2002).*

Hartley et al. "Multiple View Geometry in Computer Vision Second Edition", Cambridge University, Second Edition, 2004.*

Bazin et al. "Motion estimation by decoupling rotation and translation in catadioptric vision" Computer Vision and Image Understanding, 2009.*

Bazin et al. "An Original Approach for Automatic Plane Extraction by Omnidirectional Vision", Jan. 6, 2011.*

Kroeger et al. "Joint Vanishing Point Extraction and Tracking", Apr. 12, 2015.*

Zhongping Liu et al., "Viewing Transform of Image Based on Vanishing Point", Vocational Technological College, Normal University, Guangxi Yulin,China.

Jorge Lobo et al., "Vision and Inertial Sensor Cooperation Using Gravity as a Vertical Reference", IEEE Transactions on Pattern Analysis and Machine Intelligence, vol. 25., No. 12., pp. 1597-1608, Dec. 2003.

Danilo Caccres Hernandez et al., "Vision-based Heading Angle Estimation for an Autonomous Mobile Robots Navigation", Intelligent Systems Laboratory, Graduate School of Electrical Engineering, University of Ulsan, Ulsan 680-789, Korea.

Shigang Li et al, "Easy Calibration of a Blind-Spot-Free Fisheye Camera System Using a Scene of a Parking Space", IEEE Transactions on Intelligent Transportation Systems, vol. 12., No. 1, Mar. 2016.

International Search Report and Written Opinion dated Jul. 28, 2016 from corresponding International Patent Application No. PCT/EP2016/057746.

European Examination Report dated May 22, 2017 for corresponding European Patent Application No. 15164760.9.

Japanese Office Action dated Nov. 27, 2019 for corresponding Japanese Patent Application No. 2017-554478.

* cited by examiner

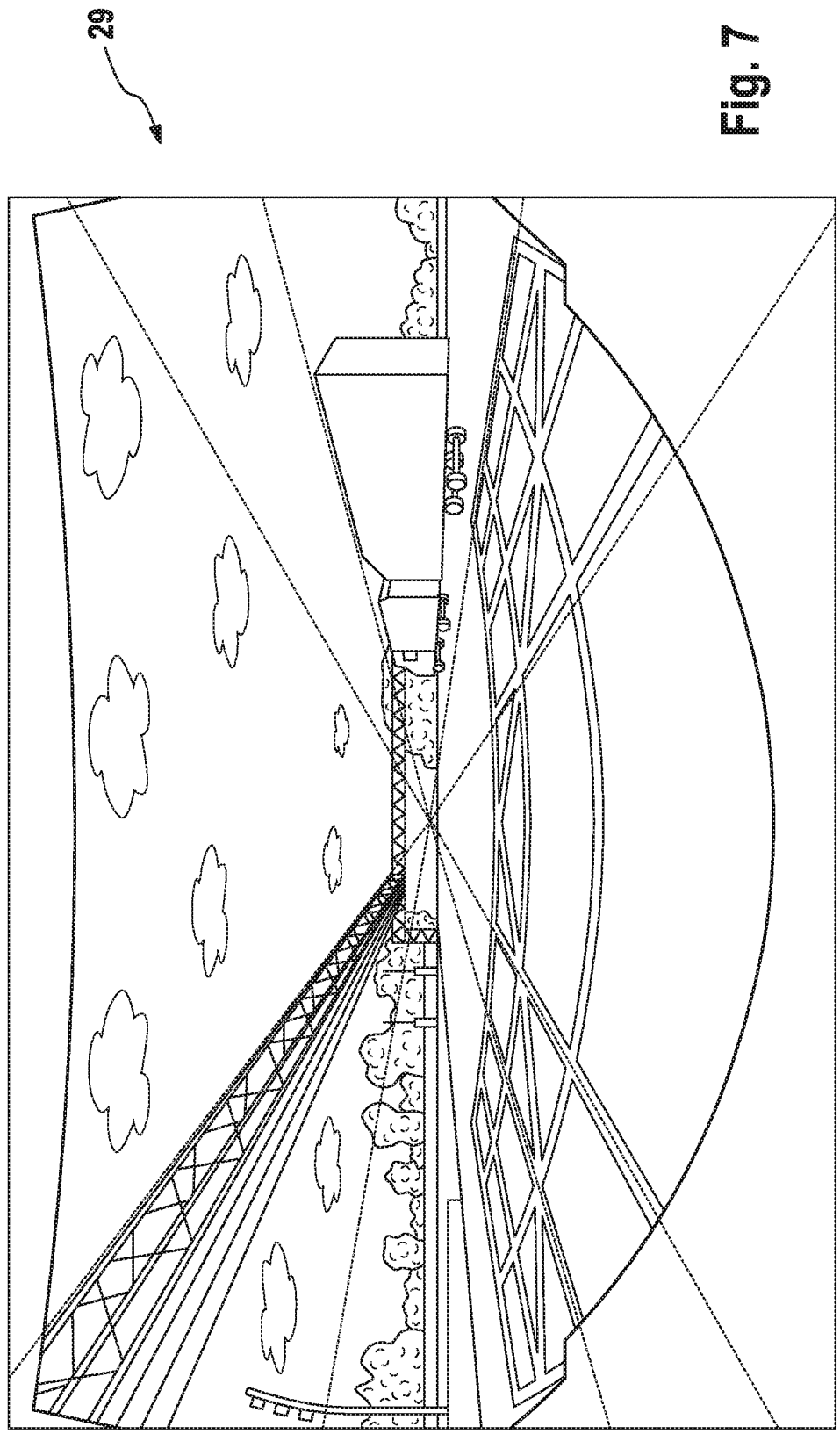

CAMERA EXTRINSIC PARAMETERS ESTIMATION FROM IMAGE LINES

CROSS REFERENCE TO RELATED APPLICATION

This application claims the benefit of International application No. PCT/EP2016/057746, filed Apr. 8, 2016, which claims priority to European application 15164760.9, filed Apr. 23, 2015. The disclosures of the above applications are incorporated herein by reference.

TECHNICAL FIELD

The technical field relates generally to camera calibration and more specifically to a method for determining extrinsic calibration parameters of a camera.

BACKGROUND

A digital camera has an optical lens and an image sensor, which includes a plurality of pixel sensors. The optical lens is used for receiving light rays from an object that is placed in front of the camera. The optical lens allows the light rays to pass through the optical lens, for travelling to the image sensor.

Calibration parameters are used to describe characteristics of the camera. These calibration parameters comprise intrinsic parameters and extrinsic parameters.

The extrinsic parameters are used to define a translation and a rotation of a reference frame of the camera for aligning the location and the orientation of the camera reference frame with the location and the orientation of a known reference frame of the world. The world refers to an area, wherein the camera is located. Values of the extrinsic parameters change in accordance to a use or an application of the camera.

Referring to the intrinsic parameters, they act to link or map pixel coordinates of an image of the image sensor with corresponding coordinates of the camera reference frame. The coordinates often refer to a set of numbers for describing a position. In effect, the intrinsic parameters relate coordinates of light rays at the optical lens to corresponding coordinates of pixel sensor of the image sensor.

In a general sense, the light rays refer to electromagnetic radiation that can be visible or invisible. An example of the invisible light rays is infrared light rays.

These mapping between the pixel coordinates of the sensor image and the coordinates of the camera reference frame, which is defined by the intrinsic parameters, is often non-linear in a case when the camera optical lens is provided in the form of a wide-angle lens. The wide-angle lens is also called a fish-eye lens. The intrinsic parameters, which are defined in a factory that produced the camera, often have fixed values that are stored in a memory unit of the camera.

The intrinsic and extrinsic parameters are together used to relate a coordinate of a point in the world to a coordinate of a corresponding point in the image sensor of the camera.

It is desirable to present an improved method of determining calibration parameters of a camera. These calibration parameters comprise intrinsic parameters and extrinsic parameters and they are used to describe characteristics of the camera.

REFERENCES

Several publications relating to camera calibration are described below.

The description may include identification by a numeric designator that is enclosed within a pair of brackets. For example, such a reference may be identified by reciting, "reference [1]" or simply "[1]". Multiple references will be identified by a pair of brackets that enclosed more than one designator, for example, "[2, 4]". A listing of the publications corresponding to each designator is shown at the end of the description of the publications.

[1] Joao P. Barreto. "A Unifying Geometric Representation for Central Projection Systems", Computer Vision and Image Understanding, 103(3), pages 207-217. September 2006.

[2] FA Andaló, G Taubin, S Goldenstein. "Detecting vanishing points by segment clustering on the projective plane for single-view photogrammetry". Information Forensics and Security (WIFS), IEEE International Workshop, 2010.

[3] E. Lutton, H. Maitre, J. Lopez-Krahe. "Contribution to the Determination of Vanishing Points Using Hough Transform". IEEE Transactions on Pattern Analysis and Machine Intelligence archive, 1994.

[4] P. Palmer and A. Tai, "An Optimised Vanishing Point Detector", British Mach. Vis. Conf., 1993, pages 529-538.

[5] Joao P. Barreto and Kostas Daniilidis. "Wide Area Multiple Camera Calibration and Estimation of Radial Distortion". Int. Work. on Omnidirectional Vision, Camera Networks, and Non-classical Cameras, Prague, May 2004.

Barreto [1] defines a unifying geometric representation for projection systems with a single effective viewpoint, including combinations of mirrors and lenses (catadioptric) as well as just lenses with or without radial distortion (dioptric systems).

Andaló et al. [2] presents an effective vanishing point detector using a single image. The method is applied to an architectural environment and recovers the vertical direction of the scene and the vanishing line for the ground plane, using an automatic segment clustering.

Lutton et al. [3] detects orthogonal directions of the scene and local vanishing points. The algorithm is based on two cascaded Hough transforms.

Palmer et al. [4] shows detection of line segments in the scene using a classical Hough transform algorithm. The vanishing points in the image are determined from the line intersections using a smooth voting kernel in the accumulation and a post process is provided to remove sampling errors in the vanishing point accumulator.

Barreto et al. [5] presents an example of a method to calibrate cameras distributed in a wide area. The correspondences between views are points obtained by moving an LED in various positions in front of the cameras. The method simultaneous recovers the projection matrices and radial distortion over multiple views.

SUMMARY

The application provides a method of calibrating at least two cameras of a vehicle. The vehicle is used for transporting people or goods. Referring to the cameras, they are fixed to parts of the vehicle. In a general sense, they can be attached to a front, sides, or rear of the vehicle. The cameras are also directed a scene of an area, wherein the vehicle is placed such that images or pictures taken by the cameras have common objects. In other words, the images of the cameras overlap.

The method includes a step of each camera taking an image of a scene. This method, unlike other methods, requires just one camera image to work.

A ground plane of the vehicle is then determined according to features of the camera image. The ground plane refers to the ground on which the vehicle is resting. The ground is supporting the vehicle.

An origin point of a reference frame of the vehicle is then defined as being located on the determined ground plane. The vehicle reference frame can include three orthogonal axes with an intersection point, wherein the origin point is placed at the intersection point.

In general, the reference frame is also called a referential. The vehicle reference frame describes a position and an orientation of the vehicle. The reference frame is usually provided in a form of a coordinate system.

After this, a translation of a reference frame of the camera for aligning a location of the camera reference frame with a corresponding location of the vehicle reference frame is determined. In one example, the translation acts to align an origin point of the camera reference frame with an origin point of the vehicle reference frame.

This determination of the translation of the camera reference frame is then performed according to an image of a calibration target of the camera and an image of the calibration target of one or more other cameras. These other cameras are provided in the vicinity of the first camera.

The initial or earlier locations of the camera in the vehicle are often known.

This method provides several advantages.

This method requires only a single frame of an image of the scene from each camera in order to determine or to calculate the camera extrinsic parameters. This is different from other methods that use multiple images from one camera in order to derive camera calibration parameters from these multiple images, which is complex. It may still be possible to determine camera position information from these multiple images but it is difficult to determine camera scale-factor information from these images.

This method can also work in real-time, as it requires just a single frame. The camera scale-factor information can be provided by the knowledge of the camera position in a surround view system.

This method also acts to correct any shift of the camera. In other words, this method is not affected by changes or shifts of the camera position. The camera position can change due to factors, such as camera housing deterioration and low vehicle tyre pressure. When the camera is embedded in a bumper of a car, the camera position can be shifted by a collision of the car with another vehicle. On the other hand, other methods, which use fixed calibration targets, are affected by changes of camera positions. Such methods are also affected by changes of positions of the calibration targets. Even the position of a calibration target, which is provided by projecting by a laser, can also change over time. These other methods then need to be performed again at predetermined intervals to compensate for changes of camera position and for changes of target positions, thereby taking up additional resources.

In a general sense, this method can be extended to a video or image sequences.

In a general sense, the feature can comprise a pixel or point, an edge, and/or a line of the image.

Similarly, the calibration target can also comprise a pixel or point, an edge, and/or a line of the image.

The determination of the ground plane of the vehicle can include a step of determining a level of the ground plane. As the ground plane is usually horizontal, the level of the ground plane is enough to define the ground plane.

The determination of the ground plane of the vehicle can be done using a Hough accumulator algorithm.

The Hough accumulator algorithm can include a step of selecting a peak of a Hough accumulator and a minimal angle between a normal vector and an axis of the camera.

The step of determining the translation of the camera reference frame can include a step of matching of the images of the calibration target from the cameras using a scale and rotation invariant matching algorithm and a step of using any mismatch of the matching of the calibration targets to determine the present position of the camera.

The method can also include a step of determining a rotation of a reference frame of the camera for aligning an orientation of the camera reference frame with an orientation of the vehicle reference frame.

This determination of the rotation of the camera reference frame is often derived from an initial extrinsic calibration of the cameras of the vehicle. The initial camera extrinsic calibration can be done in a factory that produced the vehicle with the cameras.

The application also provides a computer program product. The computer program product includes a computer-readable storage medium having computer-executable program code instructions stored therein.

The computer-executable program code instructions defines program code for receiving a camera image, for determining a ground plane of a vehicle according to features of the camera image, for defining an origin point of a reference frame of the vehicle as being located on the determined ground plane, and for determining a translation of a reference frame of the camera for aligning a location of the camera reference frame with a corresponding location of the vehicle reference frame.

The application also provides a camera control unit. The camera control unit includes two or more camera ports and a digital processor.

In particular, each camera port is intended for connecting with a corresponding camera of a vehicle. The vehicle is used for transporting people or goods. The camera is provided for taking at least one image of a scene.

The processor is intended for connecting with the camera ports in order to receive image data from the camera ports.

In use, the camera ports are adapted or configured for receiving data of an image of a scene, which is located in front of the cameras.

The processor is adapted for determining a ground plane of the vehicle according to features of data of one or more images of a scene from the respective camera port. The features can refer to a point, a pixel or a line of the camera image.

The processor is then defines an origin point of a reference frame of the vehicle as being located on the determined ground plane. The ground provides an essentially stable and constant reference for the vehicle reference frame, which is more stable or constant than the vehicle. The vehicle can shift, for example, due to changes of vehicle tire pressure.

The processor later determines a translation of a reference frame of a camera, which provided the image data, for aligning a location of the camera reference frame with a corresponding location of the vehicle reference frame.

The determination of the translation of the camera reference frame is performed according to image data of a calibration target from one camera port and another image data of the calibration target from another camera port. Each camera port is connected with one camera that is mounted onto a vehicle.

Different aspects of the applications are provided below.

The feature can refer to one or more objects being selected from a group that includes a point, an edge, or a line of the image.

The processor is also often further adapted for determining the ground plane of the vehicle using a Hough accumulator algorithm.

In one aspect of the application, the processor is further adapted for determining a rotation of a reference frame of the camera for aligning an orientation of the camera reference frame with an orientation of the vehicle reference frame.

The application also provides a camera module. The camera module includes two or more cameras and the above described camera control unit. The cameras are intended for attaching to a vehicle. The camera control unit includes camera ports, which are connected with the respective cameras.

The application also provides a vehicle with the above mentioned camera module, wherein cameras and a processor of the camera module are attached to the vehicle.

In short, the application provides an improved method of determining extrinsic parameters of a plurality of cameras of a vehicle. These cameras are part of a surround view system.

The vehicle is intended for transporting people or goods. The vehicle is also placed on the ground of an area, which has objects. The cameras are connected with and are fixed to the vehicle. The cameras are also directed at the objects of the area such that images taken or captured by the cameras have common or overlapped parts.

The method includes a step of each camera taking an image of a scene of the area. In other words, each camera records one picture frame of the objects of the scene. These images have common objects.

After this, the height or level of the ground is estimated or is determined according to lines in the images. Since the ground is often placed in a horizontal plane, the level of the ground also essentially defines the ground.

In a general sense, features in the images can replace the above-mentioned lines in the images. Examples of the features include a pixel or point, an edge, or a line of the image. One example of the line is a road marking.

A reference frame of the vehicle is then defined as being placed on the determined ground.

Following this, a rotation of each camera, which is needed to align the orientation of the camera with the orientation of the defined vehicle reference frame, is determined.

A translation of each camera needed to position the camera with the defined vehicle reference frame is afterward determined. This is done by a step of identifying common features in the images of the cameras. The common features are then used to determine relative positions of the camera. After this, translations of the cameras, which are needed to position all cameras in the defined vehicle reference frame, is determined.

The above rotation and translation of the camera can be used to describe a reference frame of the camera with respect to the vehicle reference frame.

The translation and the rotation of the camera then serve as extrinsic parameters of the camera.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 7 illustrates a vanishing point, which is placed on lines, which passes through the projected points of the image.

DETAILED DESCRIPTION

In the following description, details are provided to describe embodiments of the application. It shall be apparent to one skilled in the art, however, that the embodiments may be practiced without such details.

Some parts of the embodiments have similar parts. The similar parts may have the same names or similar part numbers. The description of one similar part also applies by reference to another similar parts, where appropriate, thereby reducing repetition of text without limiting the disclosure.

Figure 1:
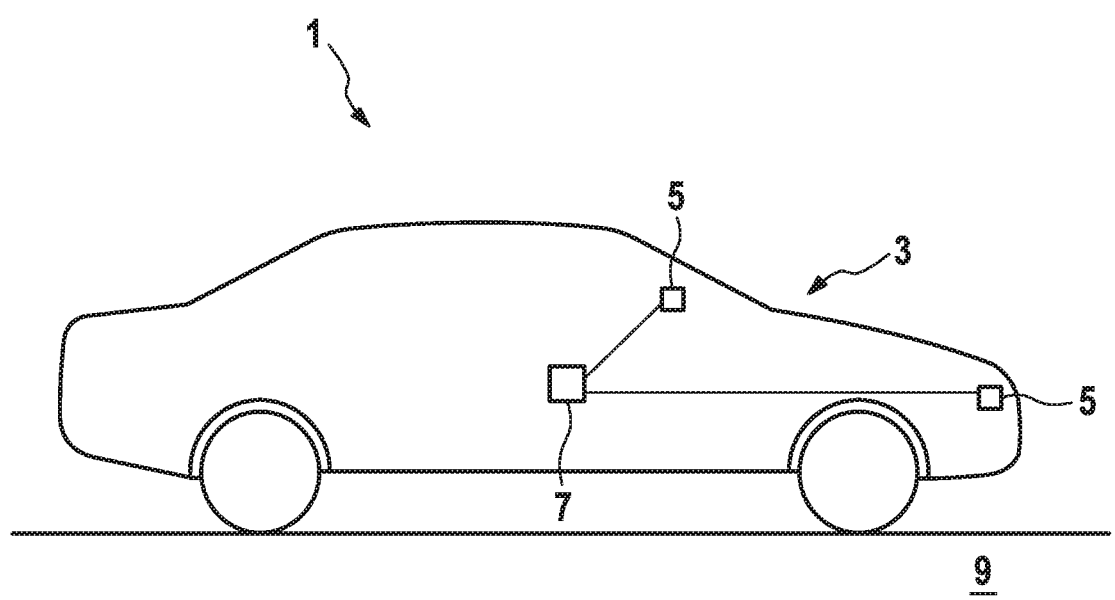
FIG. 1 illustrates a vehicle with a surround view system.

FIG. 1 shows a vehicle 1 with a surround view system 3. The surround view system 3 includes four digital cameras 5 and a processor 7 that is connected electrically to the cameras 5.

The vehicle 1 is located on the ground 9 of an area with objects. The ground 9 has a horizontal plane. The objects are not shown in the figure.

Figure 2:
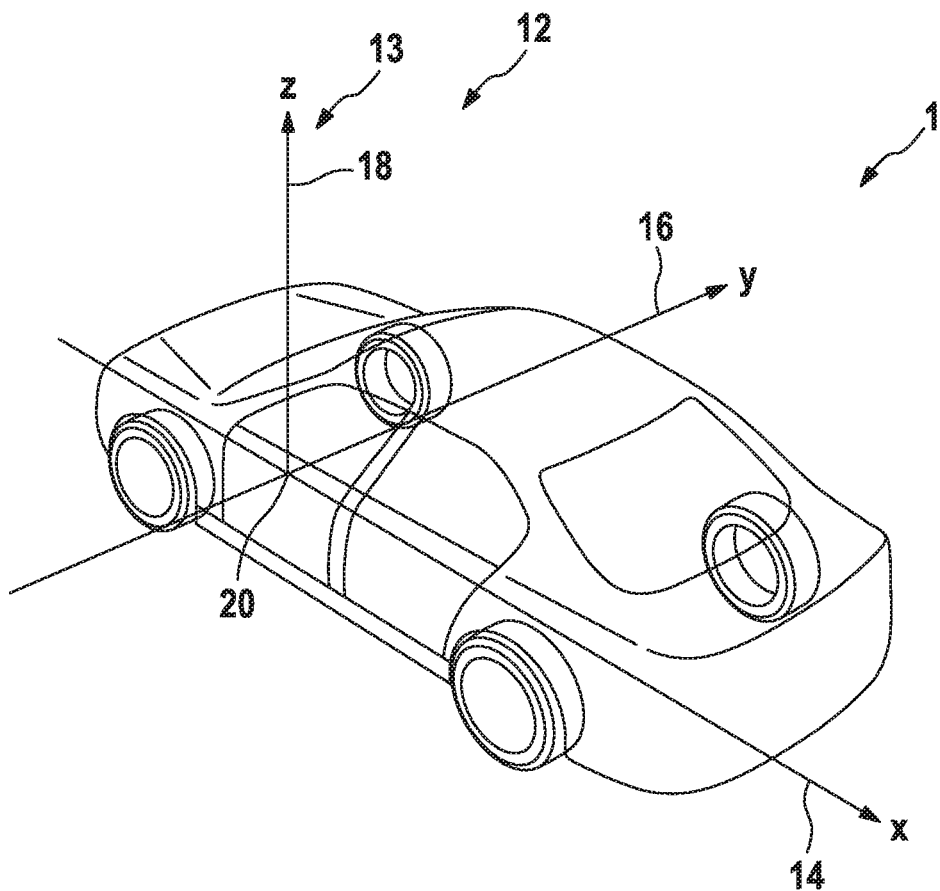
FIG. 2 illustrates the vehicle of FIG. 1 with a reference frame.

As seen in FIG. 2, the vehicle 1 has a front wheel axis. A projection of the front wheel axis on the plane serves to define the ground plane. The vehicle 1 also has a reference frame 12 with a coordinate system 13. The coordinate system 12 comprises three orthogonal axes 14, 16, and 18 and an origin point 20.

The origin point 20 is located at intersection of these three orthogonal axes 14, 16, and 18.

The orthogonal axes include an x-axis 14, a y-axis 16, and a z-axis 18. The x-axis 14 is pointed to the rear of the vehicle 1. The y-axis 16 is pointed to the right side of the vehicle 1. The z-axis 18 is pointed upwards.

Referring to the four cameras 5, they are located at predetermined positions of the vehicle 1, wherein relative positions of the cameras 5 with respect to the vehicle 1 are known or are predetermined. The cameras 5 are directed or are pointed at a scene of the area. Images of the cameras 5 overlap or have common objects or features.

In a general sense, the surround view system 3 can have two or more cameras, instead of four cameras.

Functionally, the vehicle 1 is used for transporting people and goods. The cameras 5 are used for taking pictures or images of objects and for sending data of the images to the processor 7. The processor 7 is used for processing the image data.

Figure 3:
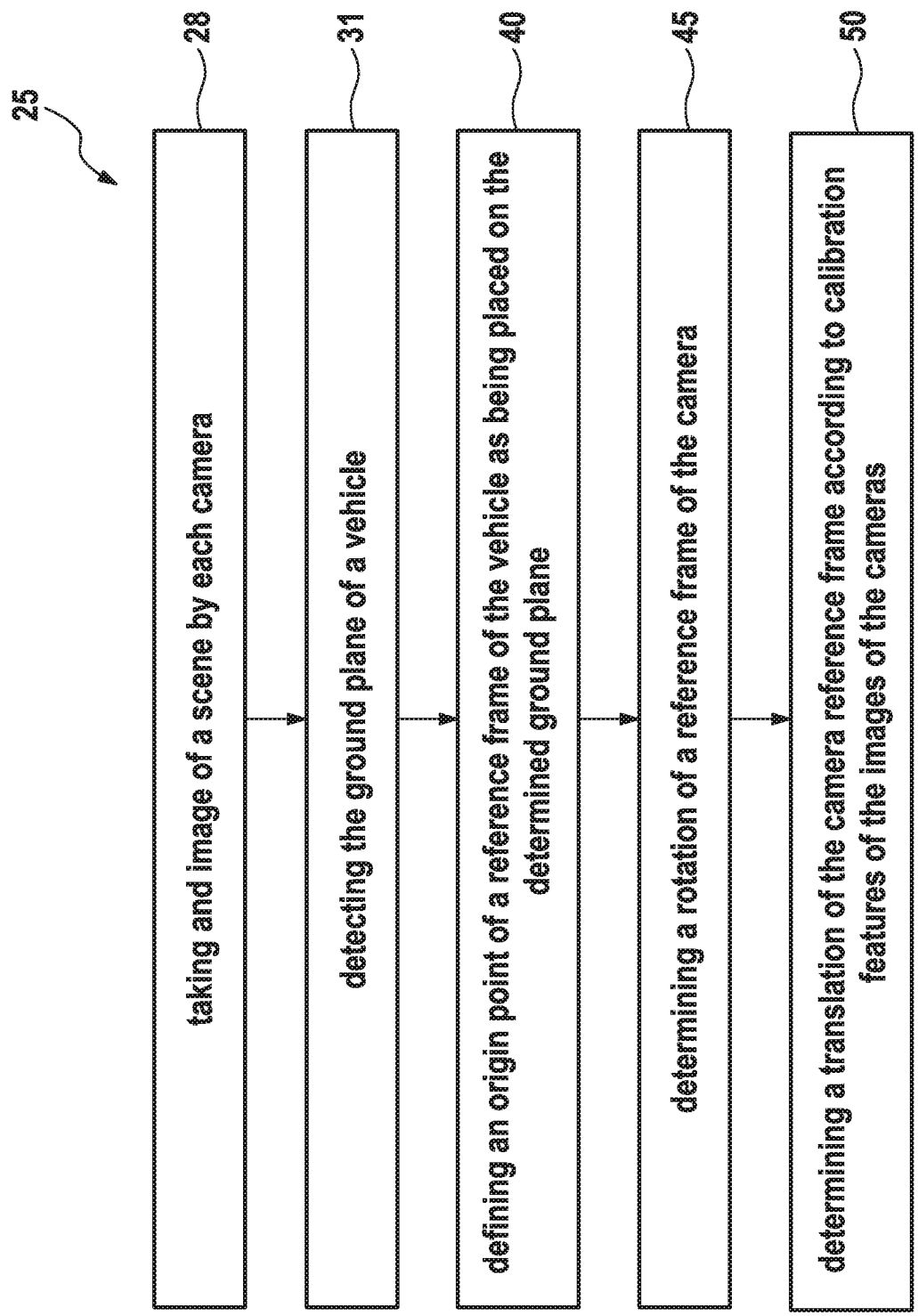
FIG. 3 illustrates a flow chart of a method for determining extrinsic parameters of cameras of the vehicle of FIG. 1.

FIG. 3 shows a flow chart 25 of a method for determining extrinsic parameters of each camera 5 of the vehicle 1, according to one exemplary embodiment, as is described below.

The extrinsic parameters define a reference frame for each camera 5. In particular, the extrinsic parameters include a rotation and a translation of the camera 5 for aligning the orientation and the location of the camera reference frame with the orientation and the location of the vehicle reference frame 12.

Figure 4:
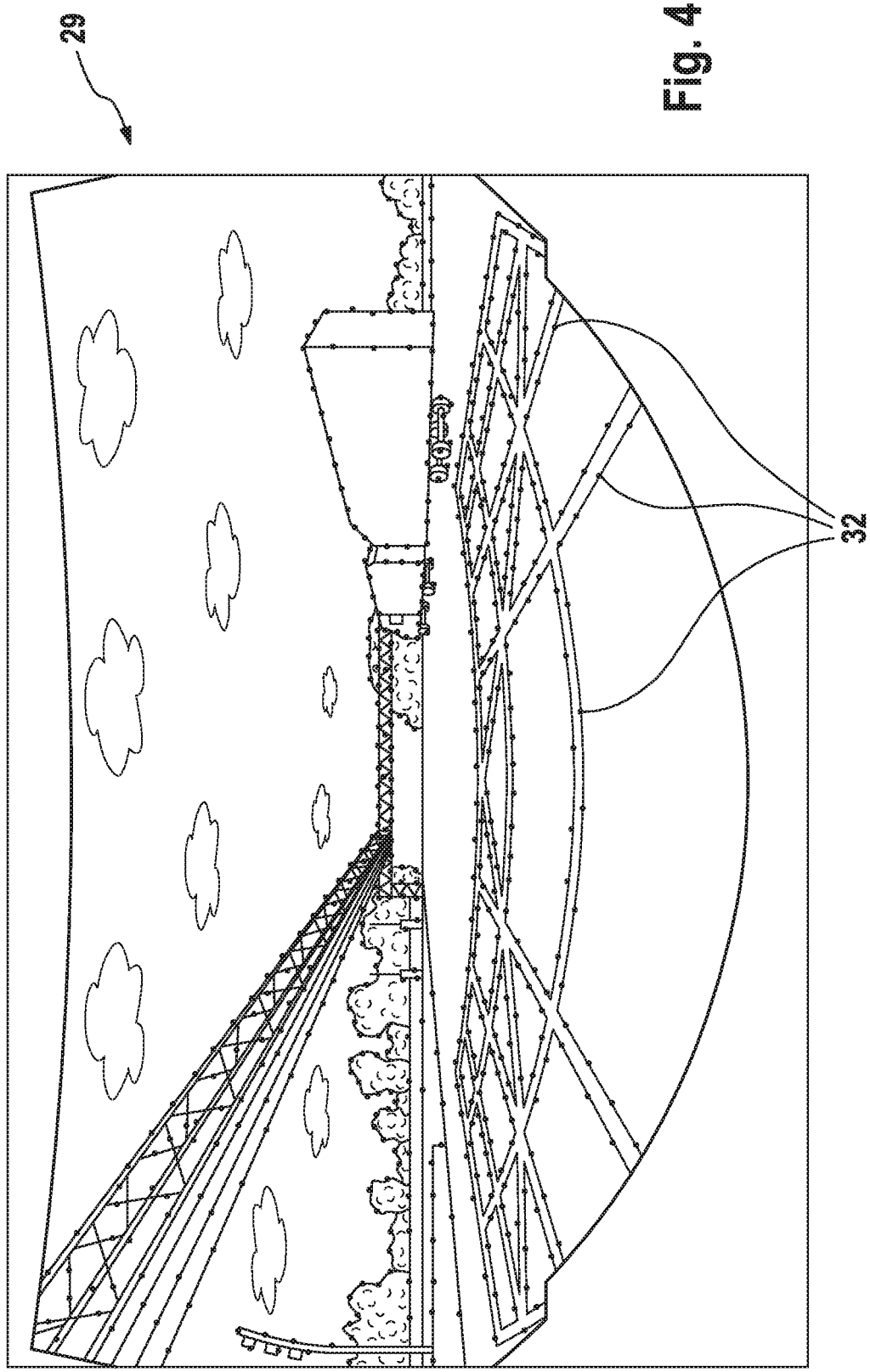
FIG. 4 illustrates an image of a scene, which is captured by the camera of the vehicle of FIG. 1.

The flow chart 25 includes a step 28 of each camera 5 taking a single image or one picture frame of a scene of the area, where the vehicle 1 is located. An image 29 of a scene of a camera 5 is illustrated in FIG. 4.

In a general sense, the camera 5 may take a video recording that comprises a series of image. This method is then applied on just one image of the video recording.

The image data is then sent to the processor 7.

The flow chart 25 also includes a step 31 of the processor 7 determining the level of the ground 9 or the ground plane of the vehicle 1, which is done after the step 28. The ground plane of the vehicle 1 is later estimated or is determined according to lines in the images.

Intrinsic parameters of the camera 5, which include focal length and other lens parameters, are used by the processor 7 to map or to relate points 32 of the image of the camera 5 to corresponding light rays that pass through the lens of the camera 5. Each point 32 corresponds to an image sensor pixel of the camera 5.

Figure 5:
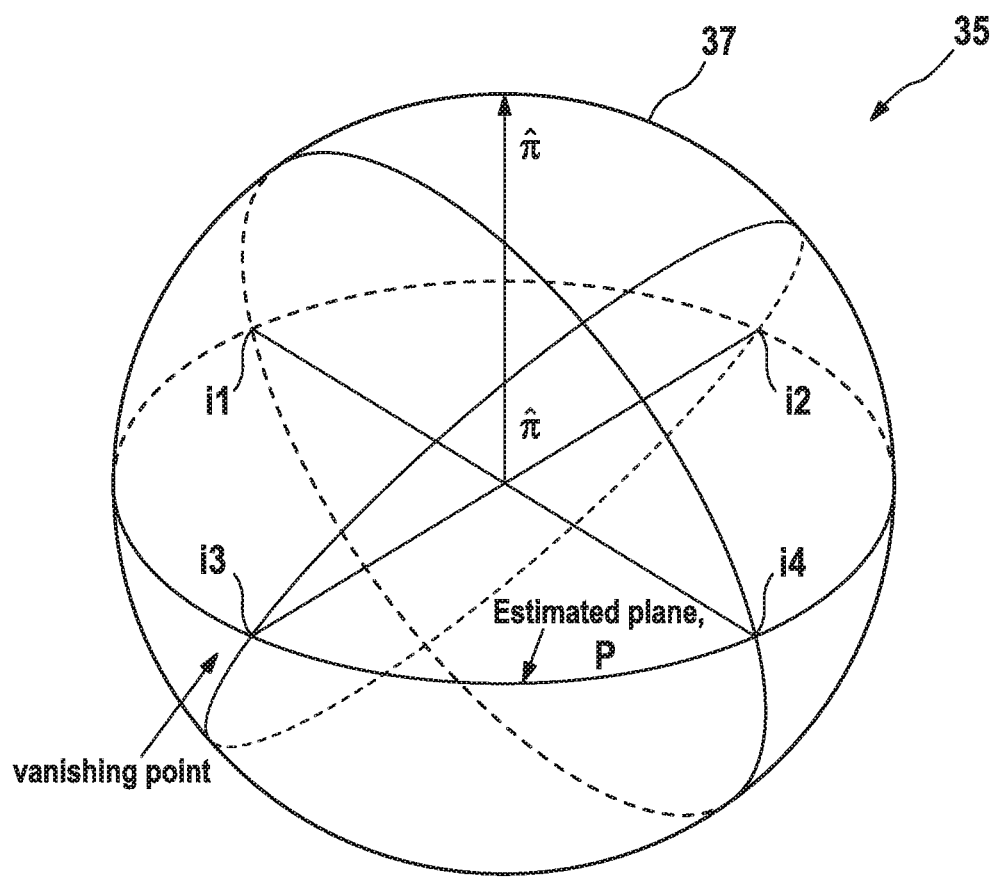
FIG. 5 illustrates a unit sphere, which acts as a computational model, for corresponding to the camera of FIG. 3.

Unit vectors are then selected by the processor 7 to represent these light rays, which enter through the camera lens from the outside of the camera 5. The unit vectors also define a unit sphere 35, which is illustrated in FIG. 5. Each unit sphere 35 relates to one camera 5.

Figure 6:
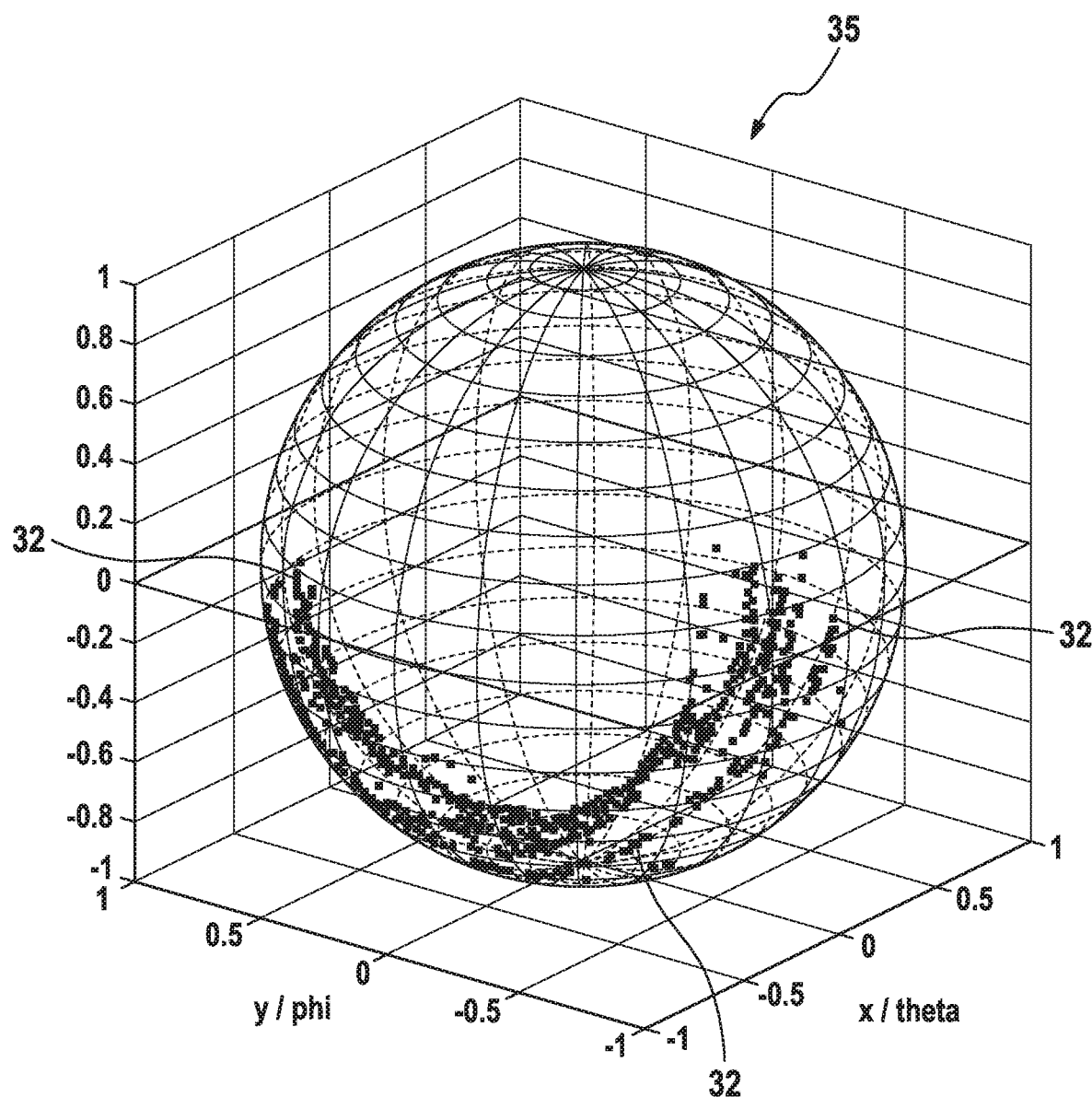
FIG. 6 illustrates the unit sphere of FIG. 5 with points of the image of FIG. 4, wherein the points are projected onto the surface of the unit sphere.

The image points 32 are then mapped or are projected onto the unit sphere 35 by the processor 7, as illustrated in FIG. 6. In particular, each point 32 of an edge of a line of the image is projected onto the unit sphere 35.

The processor 7 then uses a software edge detector to determine lines in each image on the unit sphere 35.

In detail, for each four image-points on the unit sphere 35, a set of circle lines on a surface of the unit sphere 35 is defined.

Two image-points are sufficient to define one circle on the sphere surface 37.

Four image-points then define at least one set of two circles on the sphere surface 37. The set is characterised in that two circles intersect at two points, wherein these intersection points can serve as a candidate to define a vanishing point, as illustrated in FIG. 7. The vanishing point is placed at intersection of lines, wherein these lines passes through these intersection points.

Four circles of the sphere surface provide four intersection points i1, i2, i3, and i4, which define a plane P that passes through the unit sphere 35. Thus, the minimum number of intersection points for defining a plane that passes through the unit sphere 35 is four.

Using the homogenous representation, a plane in 3D (three-dimensional) space is defined as $$a.x+b.x+c.z+d=0$$

The plane can be represented as $$\vec{\pi}.\vec{x}+d=0,$$

where $\vec{\pi}=(a, b, c)^T$ and $\vec{x}=(x, y, z)$. In this form $d/\|\vec{\pi}\|$ is the distance of the plane from the origin and $\vec{\pi}$ is the normal vector to the plane.

Each plane is represented as $$\vec{\pi}=(a/c,b/c,1)^T$$

For each four edge-points in the image, the following three planes are possible:

$$\vec{\pi}_1=\overrightarrow{P_1P_2}\times\overrightarrow{P_3P_4}$$

$$\vec{\pi}_2=\overrightarrow{P_1P_3}\times\overrightarrow{P_2P_4}$$

$$\vec{\pi}_3=\overrightarrow{P_1P_4}\times\overrightarrow{P_3P_2}$$

The three possible planes are then accumulated in Hough space.

One peak in Hough accumulator and a minimal angle between the normal vector and the camera y-axis 16 is afterward selected by the processor to be the ground plane. The selected peak probably has the highest intensity.

In a general sense, features can the lines, wherein the features include points, edges, or lines.

The flow chart 25 also includes a step 40 of the processor 7 defining the origin point 20 of the vehicle reference frame 12 as being located on the determined ground plane of the vehicle 1, which is performed after the step 28 and after the step 31.

In particular, the origin point 20 and the y-axis 16 are located on a line of the ground 9, wherein the line is defined by a vertical projection of the front wheel axis of the vehicle 1 on the ground plane.

The above step 40 is followed by a step 45 of the processor 7 calculating or determining a rotation of the camera reference frame for aligning the orientation of the camera reference frame with the orientation of the vehicle reference frame 12.

This rotation of the camera reference frame can be derived from the initial camera extrinsic calibration, which comprises a rotation of the camera reference frame. The initial camera extrinsic calibration is usually done in a factory that produced the vehicle with the cameras 5.

In detail, the normal to the ground plane in vehicle reference frame is defined as $$nc=[0,0,1]$$

Therefore, by applying the vehicle extrinsic (R|T) to estimate the ground plane, one would get the ground plane normal nc $$nc=R.n+T$$

This equation is done rewritten as follows:

$$R=(nc-T).\text{pinv}(n),$$

where pinv is the pseudoinverse.

The matrix R is later decomposed to obtain the rotations in each axis:

$$\text{angle}\_x=a\tan2[R(3,2),R(3,3)],$$

$$\text{angle}\_y=a\tan2\{-R(3,1),\text{sqrt}[R(3,2)*R(3,2)+R(3,3)*R(3,3)]\},$$

$$\text{angle}\_z=a\tan2[R(2,1),R(1,1)]$$

The flow chart 25 includes a step 50 of the processor 7 calculating or determining a translation of each camera reference frame for aligning the location of the camera reference frame with the location of the vehicle reference frame 12 is done, after the step 45.

This step 50 is done using calibration features of the images of the cameras 5.

In practise, the position of the camera 5 may change over time. This step 50 is intended to determine any change of camera location, thereby providing a more accurate location of the camera 5.

This calculation of the change of camera position is done using regression techniques.

Positions of the cameras 5 with respect to the vehicle 1 and dimensions of the vehicle 1 are previously known or determined.

The processor 7 later detects or determines a set of calibration points in each image of the camera 5 using a corner detection algorithm. The set of predetermined calibration points can also be determined using interception of lines or other methods.

The processor 7 afterward projects these detected calibration points in the vehicle reference frame 12 using earlier determined rotation of the camera reference frame and using the previously recorded camera position, which is used to determine an initial translation of the camera reference frame.

The processor 7 also projects calibration points from adjacent cameras 5 in the vehicle reference frame.

The processor 7 later matches projected calibration points from said camera 5 with the projected calibration points from the adjacent camera 5 using a scale and rotation invariant matching algorithm.

Any error of this matching of the calibration points is then used to estimate or determine a new location of the respective camera 5.

In a general sense, other devices, such as robots and machine vision, can also apply this method of calibrating cameras 5.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 1 vehicle
2 surround view system
5 camera
7 processor
9 ground
12 reference frame
13 coordinate system
14 x-axis
16 y-axis
18 z-axis
20 origin point
25 flow chart
28 step
29 image
31 step
32 image point
35 unit sphere
37 sphere surface
40 step
45 step
50 step
i1 intersection point
i2 intersection point
i3 intersection point
i4 intersection point

The invention claimed is:

1. A method of calibrating a camera of a vehicle, the method comprising:
   taking an image of a scene by the camera;
   determining a ground plane of the vehicle according to features of the image,
   defining an origin point of a reference frame of the vehicle as being located on the ground plane; and
   determining a translation of a reference frame of the camera in the vehicle reference frame;
   wherein the determination of the translation of the camera reference frame is performed according to an image of a calibration target from the camera and an image of the calibration target from at least one other camera that is provided in the vicinity of the camera and mounted on the vehicle; and
   wherein determining the ground plane of the vehicle according to features of the image comprises vanishing point detection by determining four point subsets of the set of edge points in the image as mapped onto a unit sphere, derivation of three planes out of each four point subset, followed by selecting the ground plane in Hough space where all possible planes are represented and accumulated.

2. The method according to claim 1, wherein the features comprise at least one object selected from a group that includes a point, an edge, or a line of the image.

3. The method according to claim 1, wherein the calibration target comprises at least one object selected from a group that includes a point, an edge, or a line of the image.

4. The method according to claim 1, wherein the determination of the ground plane of the vehicle comprises determining a height of the ground plane.

5. The method according to claim 1, wherein the determination of the translation of the camera reference frame comprises:
   matching of the images of the calibration target from the cameras using a scale and rotation invariant matching algorithm; and
   using any mismatch of the matching of the calibration targets to determine the position of the camera.

6. The method according to claim 1, further comprising determining a rotation of a reference frame of the camera for aligning an orientation of the camera reference frame with an orientation of the vehicle reference frame.

7. The method according to claim 6, wherein the determination of the rotation of the camera reference frame is derived from an initial extrinsic calibration of the cameras of the vehicle.

8. A non-transitory computer readable medium storing computer-executable program code instructions, the computer-executable program code instructions comprising program code instructions for
   receiving a camera image,
   determining a ground plane of a vehicle according to features of the camera image,
   defining an origin point of a reference frame of the vehicle as being located on the ground plane, and
   determining a translation of a reference frame of the camera in the vehicle reference frame,
   wherein the program code instructions for determining a ground plane of a vehicle according to features of the image comprises program code instructions for vanishing point detection by determining four point subsets of the set of edge points in the image as mapped onto a unit sphere, derivation of three planes out of each four point subset, followed by selecting the ground plane in Hough space where all possible planes are represented and accumulated.

9. A camera control unit comprising:

at least two camera ports, each camera port being provided for being connected with attaching to a corresponding vehicle camera; and a processor for treating image data from the at least two camera ports, wherein the processor is adapted for
- determining a ground plane of a vehicle according to features of the image data from at least one of the camera ports,
- defining an origin point of a reference frame of the vehicle as being located on the ground plane, and
- determining a translation of a reference frame of a camera in the vehicle reference frame,
- wherein the determination of the translation of the camera reference frame is performed according to image data of a calibration target from one camera port and image data of the calibration target from another camera port, and
- wherein determining the ground plane of the vehicle according to features of the image comprises vanishing point detection by determining four point subsets of the set of edge points in the image as mapped onto a unit sphere, derivation of three planes out of each four point subset, followed by selecting the ground plane in Hough space where all possible planes are represented and accumulated.

10. The camera control unit according to claim 9, wherein the processor is further adapted for determining a rotation of a reference frame of the camera for aligning an orientation of the camera reference frame with an orientation of the vehicle reference frame.

* * * * *